United States Patent
Sorenson, III et al.

(10) Patent No.: US 11,588,776 B1
(45) Date of Patent: Feb. 21, 2023

(54) PUBLISH-SUBSCRIBE MESSAGE UPDATES

(71) Applicant: Amazon Technologies, inc., Seattle, WA (US)

(72) Inventors: James Christopher Sorenson, III, Seattle, WA (US); Kyle Michael Roche, Mercer Island, WA (US); Shyam Krishnamoorthy, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/968,881

(22) Filed: Dec. 14, 2015

(51) Int. Cl.
*H04L 51/226* (2022.01)
*H04L 67/568* (2022.01)
*H04L 67/55* (2022.01)
*H04L 51/224* (2022.01)
(Continued)

(52) U.S. Cl.
CPC .......... *H04L 51/226* (2022.05); *H04L 51/224* (2022.05); *H04L 67/55* (2022.05); *H04L 67/568* (2022.05); *H04W 4/60* (2018.02); *H04W 8/18* (2013.01)

(58) Field of Classification Search
CPC ...... G06Q 20/102; G06Q 20/20; G06Q 20/40; G06Q 40/00; G06Q 40/04; G06Q 40/12; G06Q 30/0283; G06Q 30/04; G06Q 30/0601; G06Q 10/06315; G06Q 10/06375; G06Q 10/00; G06Q 30/0207; G06Q 30/0241; G06Q 30/0284; G06Q 50/06; H04L 67/26; H04L 67/306; H04L 67/327; H04L 67/34; H04L 67/2809; H04L 67/20; H04L 47/20; H04L 47/2408; H04L 51/046; H04L 51/08; H04L 51/14; H04L 51/18; H04L 51/20; H04L 69/22; H04L 12/1895; H04L 12/2854
See application file for complete search history.

(56) References Cited

U.S. PATENT DOCUMENTS

| | | | |
|---|---|---|---|
| 6,138,158 A * | 10/2000 | Boyle | H04L 67/02 709/206 |
| 7,552,077 B1 * | 6/2009 | Schluetter | G06Q 40/00 705/35 |
| 9,477,744 B2 * | 10/2016 | Barthel | G06F 17/30899 |

(Continued)

OTHER PUBLICATIONS

Berglin, Örjan and Lagerstedt, Carl-Emil supervisor Thore Husfeldt, http://lup.lub.lu.se/student-papers/record/1329486, "Event Notification for Mobile Clients" 2006, Section 2: Use Cases (Year: 2006).*

*Primary Examiner* — Glenton B Burgess
*Assistant Examiner* — Rachel J Hackenberg
(74) *Attorney, Agent, or Firm* — Davis Wright Tremaine LLP

(57) ABSTRACT

Technology for publish-subscribe message updates is provided. In one example, a publish-subscribe messaging method may include receiving a message from a publisher. The message may include a tuple defining message data and a source identifier identifying a data source to update the message. The publication may be queued in a queue for publication to a subscriber. Updated message data may be retrieved from the data source identified in the tuple when the message reaches an update point of the queue. The updated message data may be inserted in the message to generate an updated message which may be published to the subscriber.

20 Claims, 9 Drawing Sheets

(51) Int. Cl.
*H04W 4/60* (2018.01)
*H04W 8/18* (2009.01)

(56) References Cited

U.S. PATENT DOCUMENTS

| | | | | |
|---|---|---|---|---|
| 9,639,895 | B2* | 5/2017 | Callaway | G06Q 40/04 |
| 9,721,299 | B2* | 8/2017 | Duquette | G06Q 40/04 |
| 2002/0095399 | A1* | 7/2002 | Devine | G06F 17/3089 |
| 2003/0065739 | A1* | 4/2003 | Shnier | G06F 17/30887 |
| | | | | 709/217 |
| 2003/0225840 | A1* | 12/2003 | Glassco | G06Q 10/10 |
| | | | | 709/206 |
| 2005/0071194 | A1* | 3/2005 | Bormann | G06F 17/30578 |
| | | | | 705/2 |
| 2005/0154712 | A1* | 7/2005 | Branigan | G06F 9/542 |
| 2006/0158330 | A1* | 7/2006 | Gueziec | G01C 21/3492 |
| | | | | 340/539.13 |
| 2007/0192325 | A1* | 8/2007 | Morris | H04L 67/24 |
| 2007/0208702 | A1* | 9/2007 | Morris | H04L 67/26 |
| 2009/0292766 | A1* | 11/2009 | Morris | H04L 67/24 |
| | | | | 709/203 |
| 2010/0257223 | A1* | 10/2010 | Morris | G06Q 10/10 |
| | | | | 709/202 |
| 2014/0109128 | A1* | 4/2014 | Lee | H04N 21/4345 |
| | | | | 725/25 |
| 2015/0358777 | A1* | 12/2015 | Gupta | H04L 67/18 |
| | | | | 370/254 |
| 2015/0370693 | A1* | 12/2015 | Voccio | G06F 11/3688 |
| | | | | 717/128 |
| 2017/0006135 | A1* | 1/2017 | Siebel | H04L 69/40 |

* cited by examiner

PUBLISH-SUBSCRIBE MESSAGE UPDATES

BACKGROUND

In computer-related technologies, publish-subscribe systems are typically a messaging model or pattern where senders of messages, called publishers, send messages or publications to be consumed by receivers, called subscribers. A publisher may be an entity that publishes messages, and a subscriber is an entity that subscribes to and/or consumes the messages published by the publisher. A publisher may publish messages regardless of the number of subscribers, interests of subscribers, etc. Specifically, a publish-subscribe system may be a system where messages are published by publishers into classes without knowledge of which subscribers, if any, there may be to receive the message(s).

Subscribers do not receive messages directly from publishers, but receive messages through an intermediate broker or other system component that performs subscription matching. The broker identifies subscribers to send messages based on a subscription to a topic from the subscriber. Subscriptions may specify topics of interest, sources of messages of interest, types of messages, or content of interest, etc. A "topic" may be a character string that describes the nature of the data that is published in a publish/subscribe system. The broker matches the topic with a list of subscribers who have subscribed to that topic and delivers the message to each of those subscribers.

Any number of publishers may publish messages to a broker 115 on any variety of topics (e.g. shipping, receiving, accounting, geolocation, maintenance, etc.). Subscribers register for such topics via subscription requests received at the broker, and the broker manages the distribution of the messages. The broker receives the message from the publisher and distributes the messages to subscribers via a topic associated with the message. Some topics may have a very large number of subscribers. While brokers may rapidly distribute the messages, some subscribers may receive the message later than other subscribers, or delivery of the messages may be delayed due to inherent latencies in the system.

DETAILED DESCRIPTION

Figure 1A:
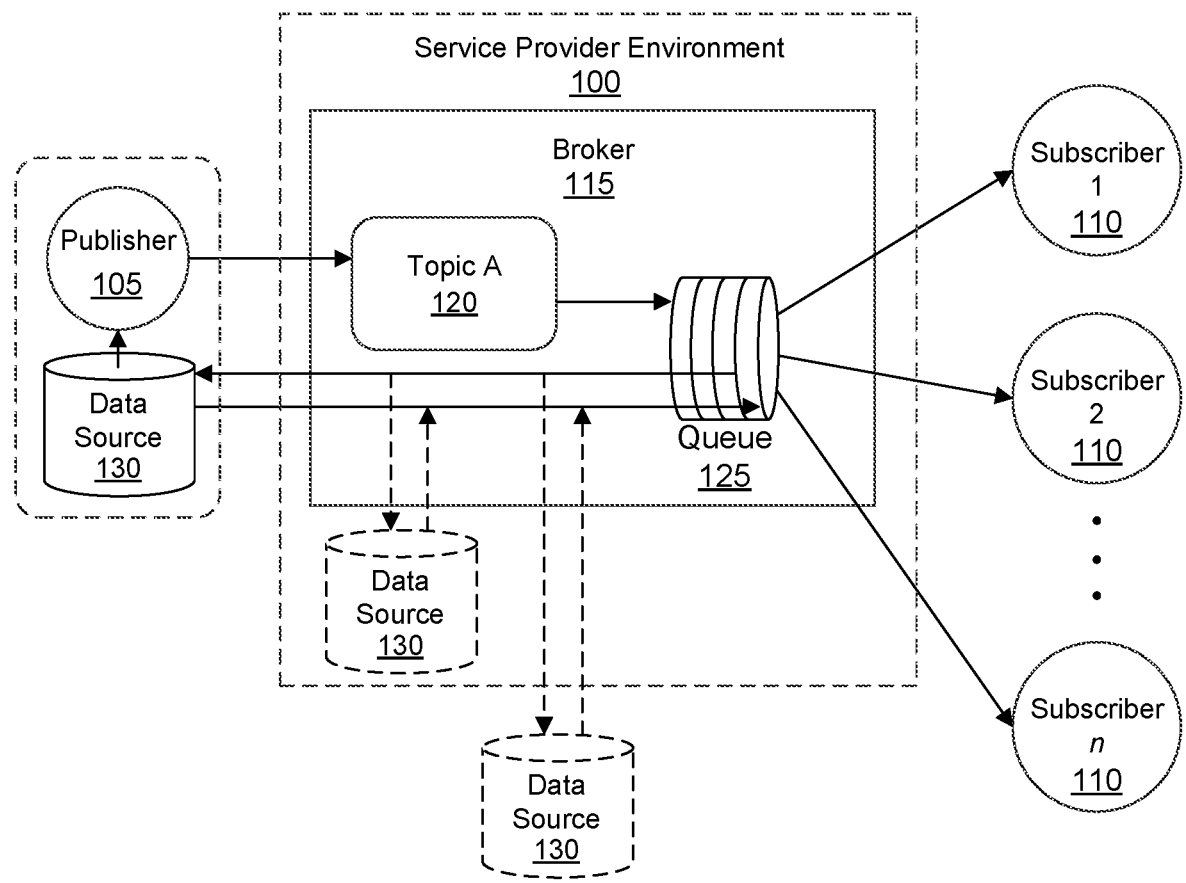
FIGS. 1A-1C are schematic overviews of systems for updating publish-subscribe messages in accordance with examples of the present technology.

A technology for publish-subscribe message updates is provided. In one example, a publish-subscribe messaging method may include receiving a message from a publisher. The message may include a tuple defining message data and a source identifier identifying a data source to update the message. The message may be queued in a queue for publication to a subscriber. Updated message data may be retrieved from the data source identified in the tuple when the message reaches an update point of the queue, such as the front or top of the queue. The updated message data may be inserted in the message to generate an updated message which may be sent (i.e., published) across a computer network, such as the internet or a local virtual network, to the subscriber.

In another more specific example, a publish-subscribe messaging method may include receiving a message from a publisher. The message may include a tuple defining message data, an update flag indicating whether the message data is to be updated, and a source identifier identifying a data source for use in updating the message data. The method may include queuing the message in a queue for delivery. A determination may be made as to whether the update flag is set to signify that the message is to be updated. Updated message data may be retrieved from the data source identified in the tuple, when the message reaches a front of the queue and the update flag is set. The message data may be substituted with the updated message data to generate an updated message. The updated message may then be sent to a subscriber.

There are inherent latencies in handling large numbers of messages generated as part of a publish/subscribe messaging system. When the data being subscribed to by a subscriber involves real-time information (such as the current time), the 'current' time reported in a message may no longer be accurate to due processing time overhead, which may delay the message. As one example, in an Internet of Things (IoT) system, IoT devices may not have real time clocks and may rely on a publish-subscribe system to provide accurate real time clock data to the IoT devices. The present technology enables handling of real-time or near-real-time data by accounting for the latencies to ensure that the latest data or at least sufficiently recent data is published to subscribers.

Generally, messages in a publish-subscribe system are processed quickly. But for various reasons, messages may be delayed for some period of time. This may happen, for example, when there are many subscribers to the message topic causing the publish-subscribe system to take a long time to send the message to all the subscribers. As another example, messages may be delayed when the message is queued into a system that becomes temporarily unavailable and then forwards the message(s) to the subscriber(s) when the system comes online again. In another example, the total number of messages in the system or for a particular topic may overwhelm the publish-subscribe system.

In existing publish-subscribe systems, the message published is the message sent to the subscribers. However, for some types of messages, stale data in the message may be a problem for the subscriber. One example problem may occur when the publisher publishes the current time of day. The subscribers who receive the messages shortly after publishing may receive a reasonable value for the current time, but subscribers receiving the message later may not get the 'current' time.

The present technology enables identifying the message content or message data and indicates to the broker that sends messages to the subscriber that the message data is to be refreshed or updated before transmission. Using the example of a message including the current time as message data, the broker may update the time in the message before sending the message to the subscriber.

Real time (e.g., at least near real time or recent-time) message updates may be extended to other types of data in addition to 'time'. For example, subscribers may desire to know the geo-location of an important asset (e.g., a vehicle or commercial truck) as the asset moves. If the asset is updating its location frequently, the outbound messages to the subscribers may be updated with the latest data even if the message was queued for delivery several location updates in the past.

FIG. 1A illustrates an example system for updating message data in a publication-subscription type of system. The system includes a publisher 105, a broker 115, and one or more subscribers 110. The publisher 105 may publish messages to the broker 115 and the broker 115 may transmit the messages to one or more subscribers 110, such as those who have subscribed to the messages from the publisher 105 or the topic 120 published by the publisher 105. In some examples, a topic 120 may identify a subject or group of subjects or may identify a publisher 105 or group of publishers. Further, a topic may be a specific type of data stream that is not necessarily human readable but is readable by machines which consume published information. The present technology may be utilized in a topic-based system, where messages are published to "topics" or named logical channels. Subscribers in a topic-based system will receive messages published to the topics to which the subscribers subscribe, and each subscriber to a topic will receive the same messages. The publisher may be responsible for defining the classes of messages to which subscribers may subscribe. The present technology may be utilized in a content-based system where messages are delivered to a subscriber if the attributes or content of those messages match constraints defined by the subscriber. The subscriber may be responsible for classifying the messages. The present technology may be utilized in a hybrid system where publishers post messages to a topic while subscribers register content-based subscriptions to one or more topics.

The broker 115 may use a queue 125 for distributing the messages to the subscribers 110 and ensuring that each subscriber 110 receives the message. The order in which individual subscribers 110 receive the message relative to other subscribers 110 may be any suitable order. In other words, the method of queuing transmission of the messages to the subscribers 110 is not particularly limited. In one example, the subscribers 110 may be queued in alphabetical order. In another example, the subscribers 110 may be queued according to an age of the subscription. In another example, the subscribers 110 may be queued according to geographical region or according to proximity to the broker 115. Various other examples are also contemplated which will be apparent to one of skill in the art. In addition, while a queuing type of system is described here, other types of message receiving systems may be used. For example, the messages may be received into a message bus type of system for distribution.

When the broker 115 receives a message for a topic 120, the broker 115 may queue publication of the message to the subscribers 110 using the queue 125. The messages may include a tuple defining, for example, message data, sender data (e.g., an identifier, address, name or the like), a broker address, a topic (which may optionally be included in the message data), a flag (or flag state) indicating whether to update the message data, and optionally a data source identifying a source of updated message data if the flag is set, where a set flag indicates that the message data is to be updated. When a message reaches the front of the queue 125, the broker 115 may retrieve updated message data from the data source 130 if the flag is set and may modify the message to include the updated message data. For example, the broker 115 may replace at least a portion of the message data with the updated message data when updated message data is requested and received to generate an updated message. The updated message may then be transmitted to the subscribers 110. When a flag is not set and the message is not to be updated, the message may be published to the subscribers 110 as received from the publisher 105 without updating.

In the example of FIG. 1A, the data source 130 for the updated message data may be external to the broker 115. For example, the broker 115 may send a request over a network, such as a local network, a virtualized network on a hardware substrate network, or the internet, for the updated message data and may receive the updated message data in response. The broker 115 system or components may be a server or a service (which may optionally comprise a plurality of servers or other components) hosted in a service provider environment 100. The data source 130 may optionally also be hosted in the service provider environment 100 separately from the broker 115. Alternatively, the data source 130 may be external to the service provider environment and may optionally be geographically remote from where the service provider environment is executed.

When a publisher 105 frequently publishes messages, each of the subscribers 110 may not have received a first message by the time a second message is published. In such a case, a subscriber 110 may be automatically added to the queue again once a message is transmitted after the subscriber 110 reaches the front of the queue 125. In other examples, such as when messages are published less frequently, the subscriber 110 may be not be re-added to the queue 125 once the subscriber 110 reaches the front of the queue 125 and the message is transmitted to the subscriber 110. If, for example, the publisher 105 publishes a first message and a subscriber 110 is queued to receive the message while the publisher 105 publishes a second, third, or other message (before the subscriber 110 reaches the front of the queue 125), the message transmitted to the subscriber 110 may include updated message data based on the latest message from the publisher 105. If an additional message is received after the updated message is transmitted to the subscriber 110, the subscriber 110 may be re-added to the queue 125. Subscribers 110 to whom the first message was transmitted prior to receipt of the second message at the broker 115 may be re-added to the queue 125 to receive the updated message data. As may be appreciated, reference to a subscriber 110 being added to or dropped from the queue 125, or reaching a position in the queue 125, may refer to an identifier identifying the subscriber 110 being added, dropped or reaching the position rather that the actual subscriber 110.

In some examples, the message data may be generated by a human operator at the publisher. In other examples, the data source may comprise a device having a transducer, sensor, or other data generating device for capturing, generating or creating the message data. The data source 130 may, in various examples, generate updated message data periodically, upon request from the publisher, upon request from the broker, continuously in a stream, at random intervals, upon occurrence of defined events, etc. The message data may include one or more data types such as images at a publisher location, a geolocation of a moving publisher, environmental temperature at the publisher, internal temperature of the publisher, state of a publisher, or the like. The type of data to be updated in the message may be any of a wide variety of other types of data or combinations of data. In one example (not shown), the message data may be obtained by the publisher 105 from another source, such as a third party. Further, the message data may optionally be obtained from another publisher, where the publisher 105 illustrated in FIG. 1A is a subscriber to the other publisher or to a topic to which the other publisher publishes messages. In such a case, the publisher 105 may optionally modify the message data before republishing to other subscribers 110.

Figure 1B:
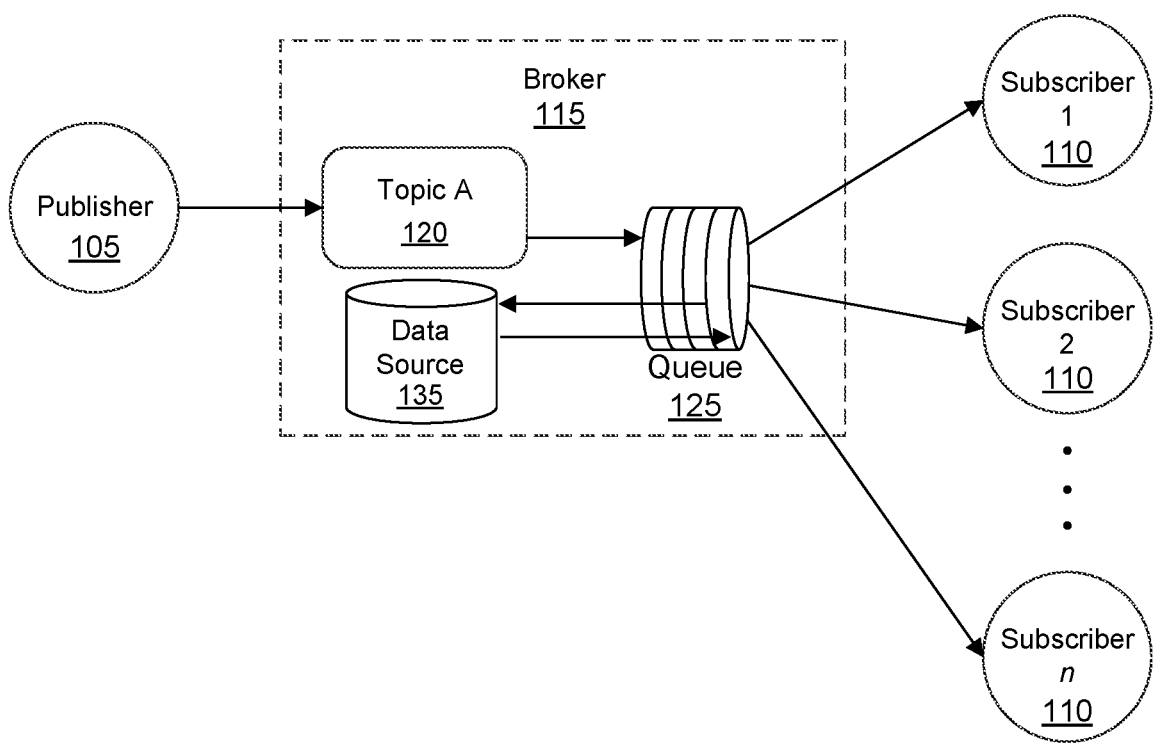

Referring to FIG. 1B, an example system for updating message data is illustrated. In this example, a data source 135 resides at or in the broker 115. For example, the broker 115 may be a server and the data source 135 may be a server clock. In this example, a message sent by the publisher 105 may include a time that is to be updated by the broker 115 before transmitting an updated message to the subscribers. Optionally, where a flag is set to update the time, the actual time of publication from the publisher 105 may be omitted from the message data since the broker 115 may complete the message with the current time at the time of publication to the subscribers 110. Similarly as described with respect to FIG. 1A, the message data may be updated with updated message data when a subscriber 110 reaches a front of the queue 125 in order to provide the subscriber 110 with the latest available message data. In some examples, the front of the queue may represent the next message in line to be transmitted or rather the next subscriber to which the message is to be transmitted. However, the front of the queue may alternatively represent a portion of the queue approaching transmission that will be sent earlier than other queued messages or subscribers. For example, a front of the queue may be a number of subscribers, such as 5, 10, 100, or any other suitable number which will be sent out soon and an update may be performed when a subscriber is within the next 5, 10, 100, etc. subscribers to which messages will be sent in order to avoid a delay when the subscriber is the next subscriber to receive the message. The point at which the message is updated within the queue may be an update point.

Figure 1C:
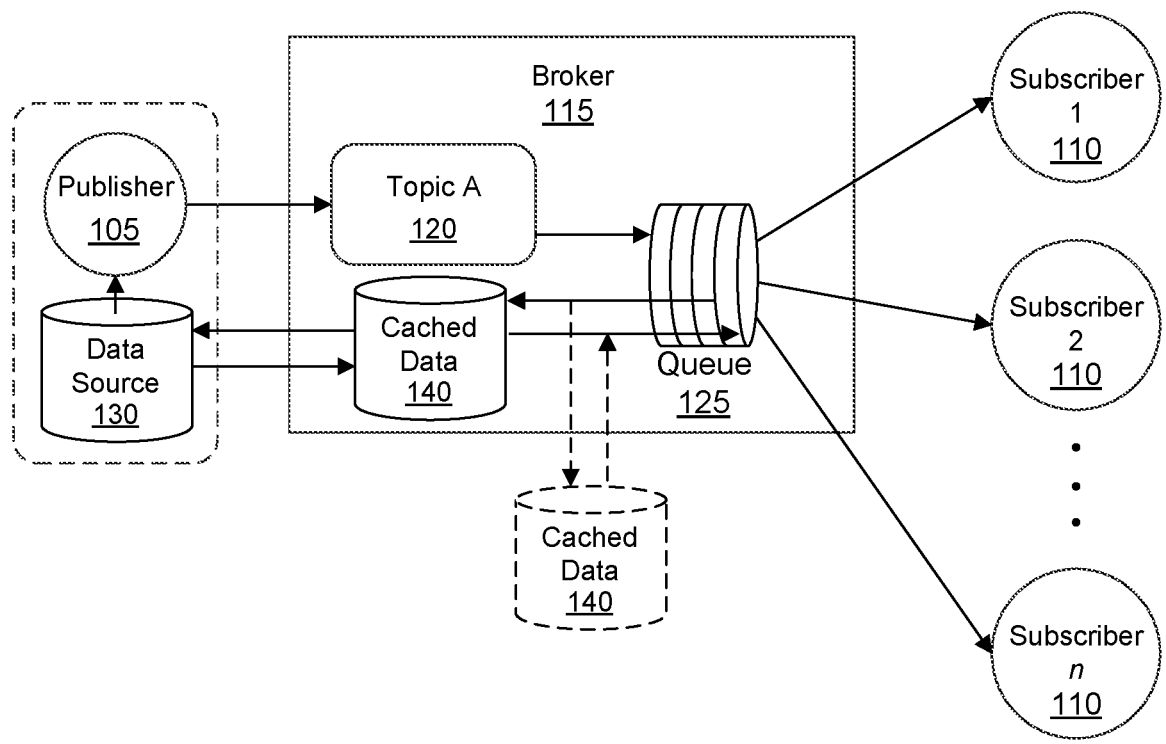

Referring to FIG. 1C, an example system for updating message data is illustrated. In this example, the data source 130 is external to or separate from the broker 115, as in FIG. 1A. However, a cached data store 140, which caches data from the data source 130, may be available for use by the broker 115. The cached data store 140 may be a part of the broker 115 or may reside outside the broker, such as in a service provider environment or elsewhere, and be readily accessible to the broker 115. Frequent requests sent to a data source 130 for updated message data may be taxing on the data source 130 and a network between the broker 115 and the data source 130. Such requests may introduce additional latency into the delivery of the updated messages to the subscribers 110. FIG. 1C illustrates an example where the broker 115, or the service provider environment, caches updated message data retrieved from the data source 130. The broker 115 may then rely on the cached updated message data for updating a message for transmission to one or more subscribers 110.

In one example, the broker 115 may cache the updated message data for a predetermined period of time. After expiry of the predetermined period of time, the broker 115 may again request updated message data from the data source 130. The predetermined period of time may be set, for example, by the publisher 105, the broker 115, or the subscriber 110. In some instances, caching the updated message data for the predetermined period of time may result in the same message data being delivered to a subscriber 110 as for messages omitting caching of message data (see, e.g., FIG. 1A). For example, if the broker 115 updates a message using the cached data 140 and transmits the updated message to a subscriber 110 before a subsequent publication from the publisher 105 within (or without) the predetermined period of time, then the updated message received by the subscriber 110 may include the same updated message data as if the broker 115 requested updated message data from the data source 130 for each message sent. In one example, the predetermined period of time may represent or approximate a periodicity of publication (i.e., regular time interval between publications) by the publisher 105. In another example, the predetermined period of time may represent an acceptable degree of error or latency at the subscriber 110. In yet another example, the predetermined period of time for using the cached data 140 may be on a per-message basis and may be defined in the tuple or in the message data. Use of cached data 140 for updating messages may be more frequent than retrieval of updated message data from the data source 130, in some cases.

The present technology may utilize a client/server or virtualized network architecture that involves client computers connecting through a server with other client computers. Such a configuration may facilitate message brokering, subscription to topics, updating of published messages with updated message data and so forth. An example of the client/server architecture or virtualized network of the present technology provides a central data center having at least one server provided therein.

In one example, the systems of FIGS. 1A-1C may be used to facilitate autonomous driving technologies. For example, cars, street lights, traffic cameras and the like may be IoT publishers and/or subscribers. In one example, a traffic camera may be a publisher and a car may be a subscriber, where the publisher publishes images indicating that there is currently a human in a crosswalk so that the car can navigate safely in the vicinity of the crosswalk. Transmitting the latest data to the car as updated message data rather than an image demonstrating that a pedestrian was in the crosswalk 5 minutes previously (e.g., from the original message data) may be valuable in maintaining the safety of humans in such a situation.

As another example, geolocation of cars may be published to other subscriber cars to manage positions and relationships of the cars relative to other of the cars. As another example, the geolocation of cars in a fleet may be published to a subscriber manager to identify a present location of cars in the fleet, whether a car has crossed a geofence, etc. As another geolocation example, a celebrity may wish to publish a bus location to millions of followers as a tour bus travels between destinations. With latency, subscribers later in the queue may receive inaccurate information and potentially miss a sighting of the tour bus passing, but with the updated message data according to the present technology, each subscriber may receive the latest, updated message data when the message is published to each subscriber.

As another example, a coffee maker may be a subscriber of time data and may subscribe to publications of time. The broker may act as a publisher to publish the time to such a subscriber or the publisher may be another entity, such as a manufacturer of the coffee maker. The coffee maker may be programmed to turn on at 8:00 a.m., but may lack an internal clock or may have an inaccurate clock. When the coffee maker is able to accurately determine the current time, the coffee maker may behave more precisely as programmed, such as to accurately turn on at 8:00 a.m. Depending on a frequency of publication of the time or a frequency of receipt of the publication, the coffee maker may use delay loops or the like based on an actual time received prior to 8:00 a.m. in order to turn on at approximately the correct time.

Figure 2:
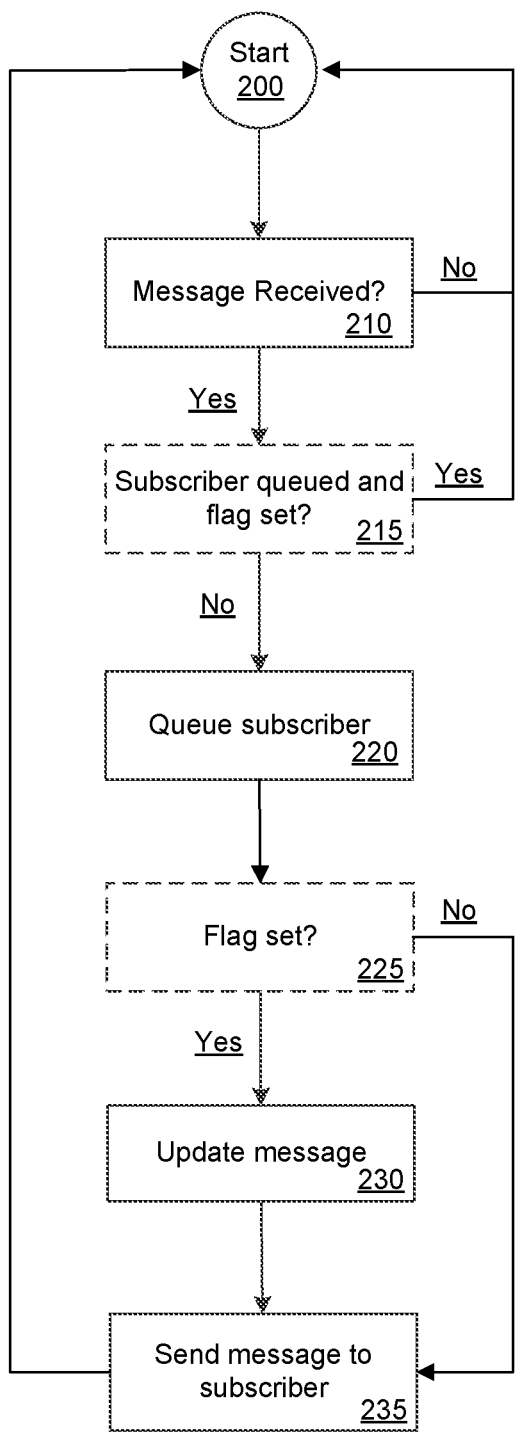
FIG. 2 is a schematic overview of a process for updating publish-subscribe messages in accordance with an example of the present technology.

Referring now to FIG. 2, a process for updating message data is illustrated as a simple decision tree or flow diagram. After a start 200 of the process, receipt of a message from a publisher may be detected 210. If no message has been received ('no' at 210), then the process may return to the start 200 and wait for a message to be received. If a message has been received ('yes' at 210), then a determination may be made at 215 as to whether the subscriber is presently queued and whether the flag is set to update the message. If the subscriber was previously added to the queue and a message has not yet been transmitted to the subscriber (i.e., the subscriber is presently queued), the subscriber need not be added to the queue a second time if the flag is set to update the message data ('yes' at 215) since the subscriber will receive the latest message data when the message is transmitted. If the flag is not set to update the message data ('no' at 215) then the subscriber may be added to the queue again and have multiple pending message transmissions. If the subscriber is not presently queued ('no' at 215), then the subscriber may be queued regardless of whether the flag is set. The subscriber may be queued 220 for transmitting the message to the subscriber when both of the conditions in 215 are not met. In one example, the process at 215 may be omitted and a subscriber may simply be queued 220 each time a message is received even if the subscriber is already queued. The queue may be a first-in-first-out queue which is processed in a serial manner.

The process may optionally continue at 225 by determining whether the flag is set to update a queued message. This determination may be made when the message reaches or nears a front of the queue. In some examples, updates to each message may be made or attempted and flags may not be used because the flags would be unnecessary to cause updating of the message data. If the flag is not set ('no' at 225), then the message may be transmitted to the subscriber at 235 without updating and as received from the publisher. However, if the flag is set ('yes' at 225), then the message may be updated 230 before transmitting the message to the subscriber at 235. The message may be updated as is described elsewhere in this disclosure, such as, for example, in the discussion of FIGS. 1A-1C.

Figure 3:
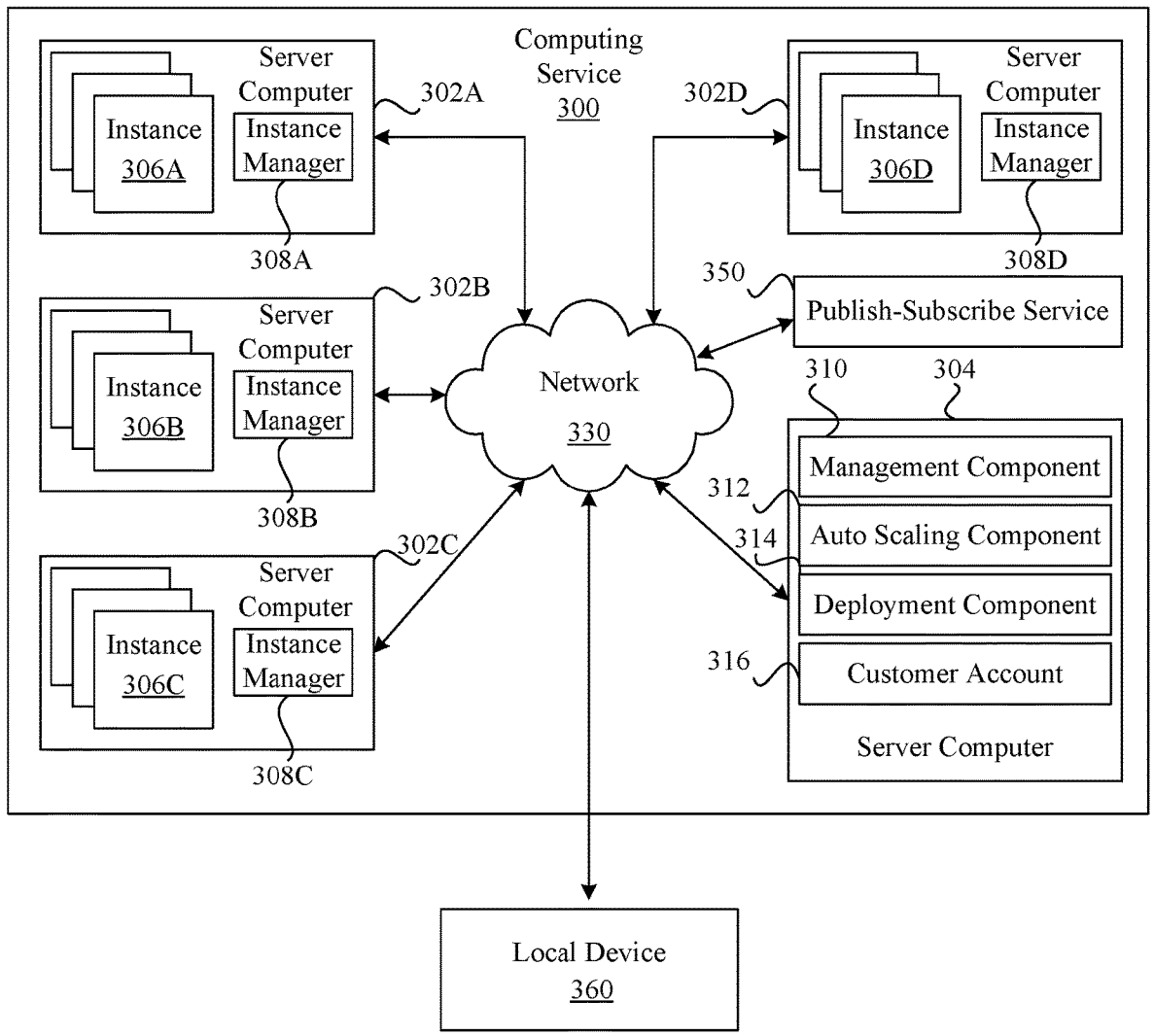
FIG. 3 is a schematic overview of a virtual computing resource service in accordance with an example of the present technology.

The publish-subscribe message updating technology using the methods or aspects described may be executed or maintained in a data center or service provider environment for a computing service provider. FIG. 3 illustrates how components of a data center may function as a computing service 300 in a service provider environment to provide a platform for computing instances which the present technology may use to execute nodes as described. The computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 300 may be used to host or provide any number of potential services to customers, such as storage, compute, or other services. In one example, a publish-subscribe service 350 may be provided for managing subscriptions, message receipt, message updates, message transmission and the like between the server computers 302A-302D, or between devices (e.g., multiple of local device 360) external to the computing service 300 or between a server computer 302A-302D and a device (e.g., local device 360) external to the computing service 300 as has been described. In one example, the publish-subscribe service may be hosted on one or more of the server computers 302A-302D rather than being separate from these server computers 302A-302D as illustrated.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
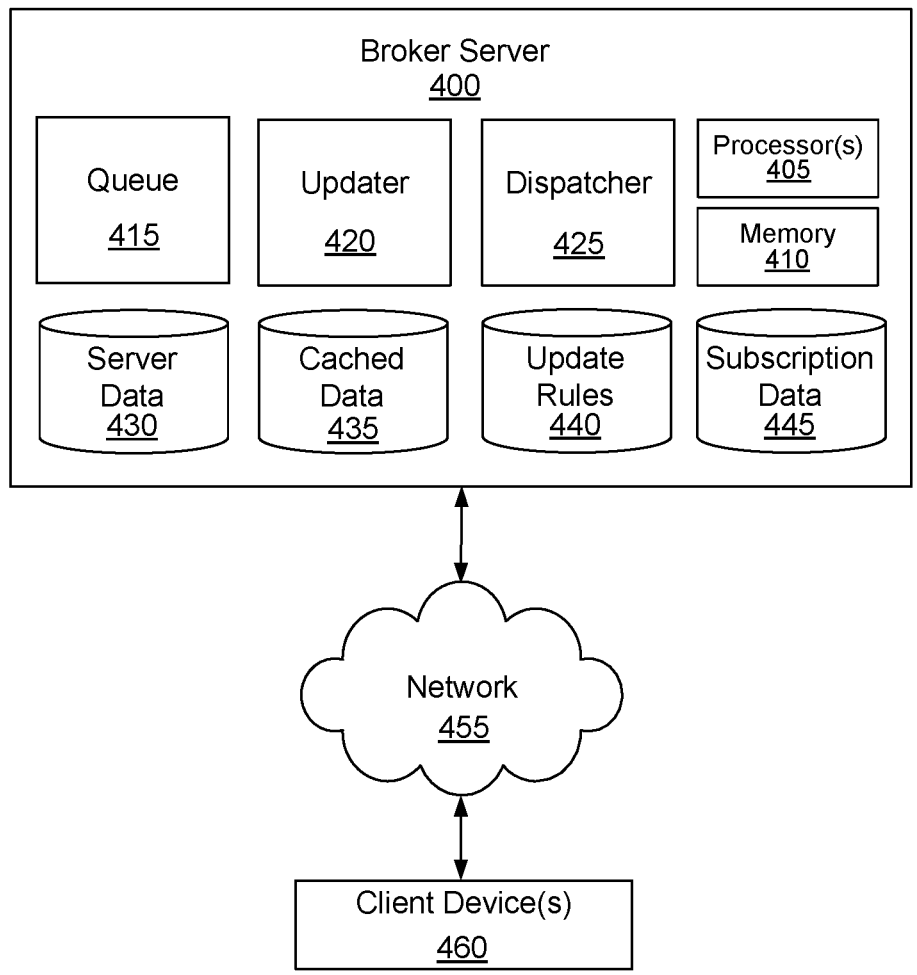
FIG. 4 is a block diagram of a system for managing publish-subscribe messages, publications and subscriptions in accordance with an example of the present technology.

Referring now to FIG. 4, a block diagram of a system in a service provider environment for managing publish-subscribe message updates is illustrated in accordance with an example of the present technology. The system elements may be implemented using one or more computing devices in a service provider environment, such as a broker server 400 or broker service as an example computing device, as well as client devices 460 which may be external to the service provider environment, and may be implemented across a network 455. The system may include one or more data stores 430-445 and a number of modules or services 415-425 as part of a publish-subscribe message update service for updating messages published by publishers and received by the broker server 400 prior to republishing to subscribers. Client device 460 may represent a plurality of client devices comprising the publisher(s) and subscriber(s), where messages are transmitted over the network 455.

Computing services offered by a service provider environment, may include a computing device (e.g., a droplet) that executes one or more servers or computing instances on the computing device. One or more servers (e.g. a computing instance operating as a server) may be operated to execute an operating system and implement a communications application which is scalable and asynchronous. A user may create, launch, and terminate servers as desired. The user may have some control over the geographical location of servers or clusters of servers to optimize latency and provide high levels of redundancy.

The broker server(s) 400 may be a virtual computing instance as previously explained, and the virtual computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisors and virtualization control plane) may provide platforms on which virtual computing instances may be created. In other words, the virtual computing instances may execute on the hardware layer by using the platform provided by the virtualization layer. This computing service architecture that supports computing instances is illustrated in more detail in FIG. 4.

The broker server 400 may be configured to receive messages from a publisher. Upon receipt of a message, the broker server 400 may queue the message for delivery to a subscriber via a queue 415. The broker server 400 may maintain a subscription data store 445 identifying subscribers and topics to which a subscriber may subscribe or to which a publisher has published or may publish one or more messages. The broker server 400 may identify a topic in a message, either explicitly identified in the message, implicitly determinable based on the message data, or based on the publisher. If the topic in the message corresponds to a topic in the subscription data store 445 then subscribers having subscribed to the topic may be queued to receive the message. In one example, the subscription data store 445 may comprise a multiple data stores managing subscribers and topics. The broker server 400 may store or manage publisher data and/or authentication data for authenticating publishers or subscribers as well. In this example, the subscription data store 445 may be used to manage aspects of the subscription in addition to those pertaining specifically to subscribers.

The message from a publisher may include a tuple defining message data, an update flag indicating whether the message is to be updated and a source identifier identifying a data source to update the message. Any other suitable information or information fields may also or alternatively be included in the tuple. For example, the tuple may include the publisher's source address and the publication queue's address or queue identifier. The updater 420 may update the message using updated message data from a data source (e.g., cached data 435) to generate an updated message when the message reaches a front of the queue 415. The dispatcher 425 may transmit or publish the updated message from the broker server 400 to the subscriber(s).

The system may include an update rules data store 440. The update rules data store may store rules defined by a publisher, subscriber, service provider or third party for use in updating messages. For example, rather than identifying a data source in the message, a rule in the update rules data store 440 accessible by the broker server 400 may be used to determine when and/or how to update the message. A rule may define, for example, that when a message is received from a specified publisher the message or includes content matching specified filtering criteria, then the message is to be updated as defined in the rule. Specifically, the message data may be updated using updated message data from a data source defined by the rule.

In some examples, the data source for use by the updater 420 in updating the message may be external to the broker server 400 or a service provider environment in which the broker server 400 is executed. Updated message data from this data source may optionally be cached in a cached data store 435. In some examples, the server may have or may provide the data store, illustrated as the server data 430. For example, the server data 430 may be a time from a server clock as the data source or a temperature from a thermometer as the data source.

In one example, the tuple in the message may include a variable indicating that updated message data from the data source is to be inserted into the message and optionally to replace the variable and/or other message data. The updater 420 may encounter the variable and perform the programmed operations.

Client devices 460 may be available to access and interact with the server 400 in a computing service provider environment or one or more computing instances or clusters, over a network 455. Example client devices 460 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display that may receive and present the message content.

The service provider environment may be implemented across one or more computing device(s) connected via a network 455. For example, a computing device may include a data store and various engines and/or modules such as those described above and such modules may be executable by a processor 405 of the computing device. The system may be implemented as a plurality of computing nodes or computing instances, each of which comprises at least one processor 405 and a memory 410, where the computing nodes are configured to collectively implement the modules, data stores and so forth.

The modules that have been described may be stored on, accessed by, accessed through, or executed by a computing device. The computing device may comprise, for example, one or more processors 405 and one or more memory modules 410. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 460 that may be coupled to the network 455. The client device(s) 460 may communicate with the computing device over any appropriate network, including an intranet, the Internet, a cellular network, a local area network (LAN), a wide area network (WAN), a wireless data network or a similar network or combination of networks. In one example, the network 455 may be the communications network of the present technology.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
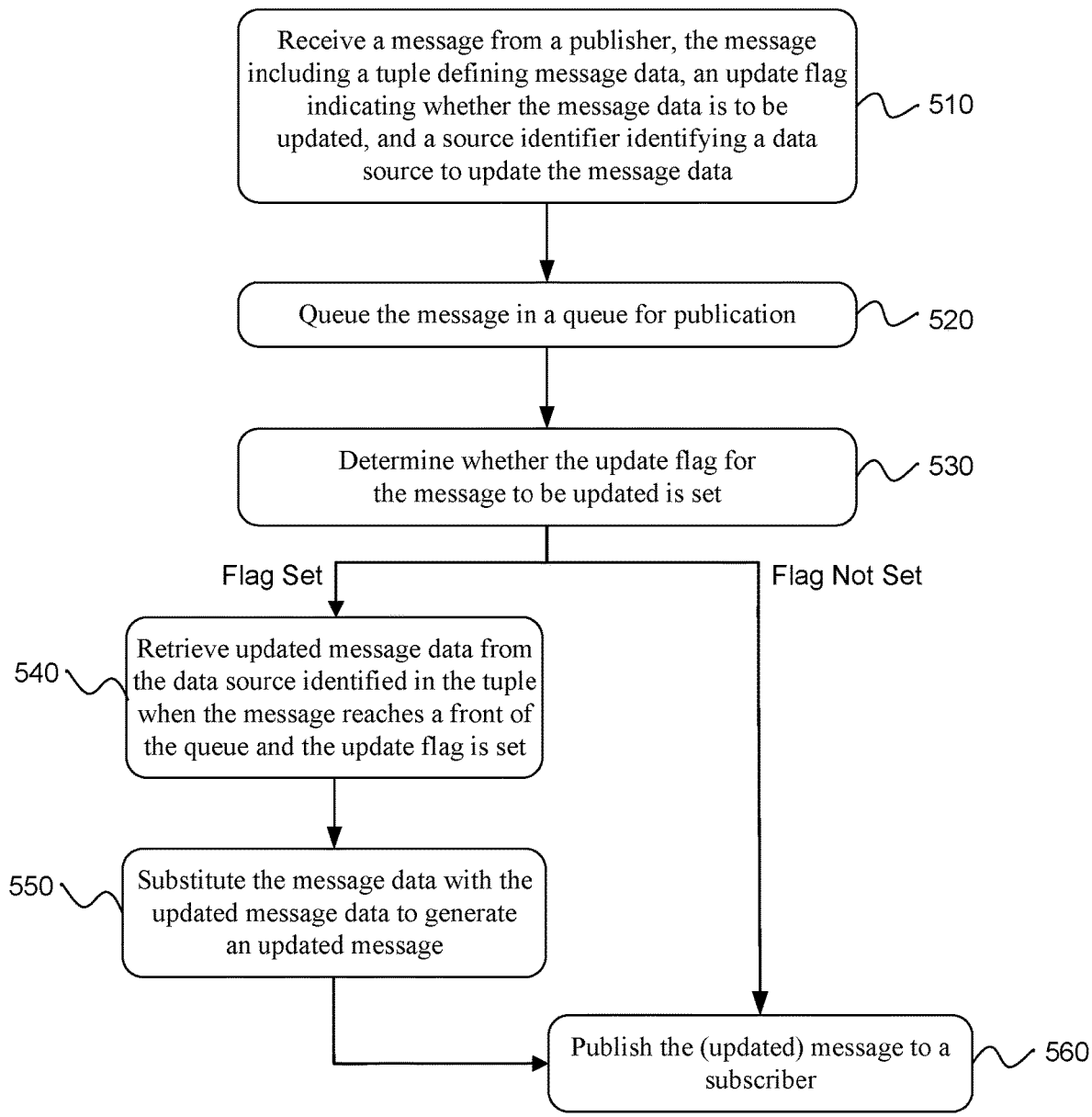
FIGS. 5-6 are flow diagrams for publish-subscribe messaging methods in accordance with examples of the present technology.
Figure 6:
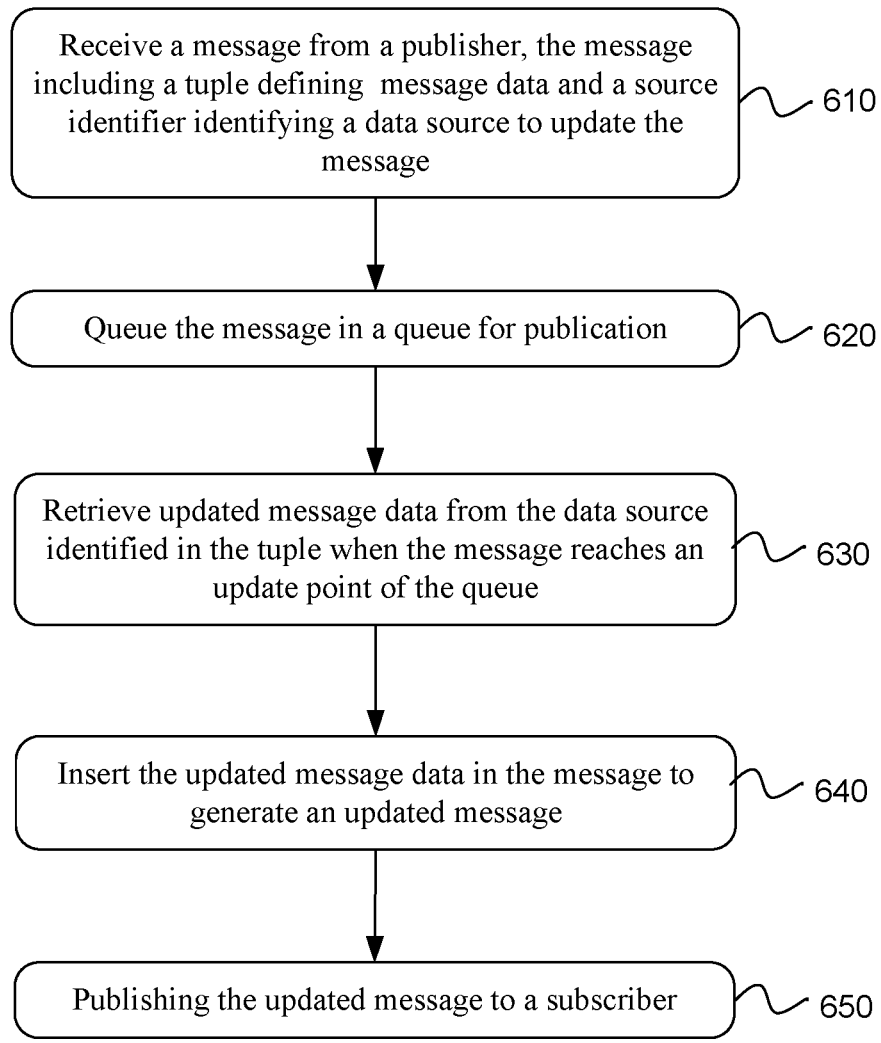

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for a publish-subscribe messaging method. The method may include receiving 510 a message from a publisher. The message may include a tuple defining message data, an update flag indicating whether the message data is to be updated, and a source identifier identifying a data source for use in updating the message data. The method may include queuing 520 the method in a queue for delivery. A determination 530 may be made as to whether the update flag for the message to be updated is set. Updated message data may be retrieved 540 from the data source identified in the tuple when the message reaches a front of the queue and the update flag is set. The message data may be substituted 550 with the updated message data to generate an updated message. The updated message 560 may then be published to a subscriber. The subscriber may include any number of subscribers.

In one example, the method may include sending the message as received from the publisher when the update flag is not set (e.g., the flow in FIG. 5 proceeds from 530 to 560). The flag may be set by the publisher to indicate, for example, whether the message data includes time-sensitive data, such as in an example where the subscriber(s) desire to receive the latest or more recent available data. If the flag is not set, the message data may not be particularly time sensitive and the message may thus be sent to the subscriber without updating.

In one example, the message is received from the publisher at a service. The service may be a broker service for managing the publication of messages to the subscribers. The service may include a server clock. In some examples, a subscriber may rely on time data from other sources to determine the time or to perform functions with at least relative timeliness. For example, these subscribers may rely on a timestamp in the message data from a publisher to determine the time. Because the service includes a clock and publication of messages to subscribers may be delayed from when the message is received from the publisher such as due to the number of subscribers, the service may update the message data to include the current time using the server clock as the data source.

In another example, the data source may be something other than the server clock whether the message data to be updated includes a time or not. For example, the message data to be updated may include data specific to the publisher, with data types such as images of a publisher location, a geolocation of a moving publisher, environmental temperature at the publisher, internal temperature of the publisher, etc. The type of data to be updated in the message may be any of a wide variety of other types of data or combinations of data. If the service is able to provide the updated message data without reliance on another source, such as in the clock example above, the service may update the message data using its own data to expedite updating and publication of the messages. Otherwise, the service may retrieve the updated message data when updating the messages. For example, the data source may be the publisher. The data source may be external to the service. The data source may be external to a service provider environment hosting the service.

In some examples, this or other methods described herein may be implemented wholly or partially as computer readable program code executed by a processor and the computer readable code may be embodied on a non-transitory computer usable medium.

Referring now to FIG. 6, a flow diagram of a method is illustrated for publish-subscribe message updates. In this example, the publish-subscribe messaging method may include receiving 610 a message from a publisher. The message may include a tuple defining message data and a source identifier identifying a data source to update the message. The message may be queued 620 in a queue for publication to a subscriber. Updated message data may be retrieved 630 from the data source identified in the tuple when the message reaches an update point of the queue, such as a front of the queue for example. The updated message data may be inserted 640 in the publication to generate an updated message which may be published 650 to the subscriber.

Queuing the messages with updates being performed when the message reaches the front of the queue may enable subscribers to receive the latest data, as opposed to potentially stale data or data which is not current. In one example, the method may include foregoing additional queuing of messages that are currently queued if a subsequent message is received with updated data before the prior message is published. In other words, a message that is already present in the queue is not added to the queue again if another message with updated message data is received before the first message has been published. Because it is the message may be updated with the latest updated message data when publishing, queuing the message again would be unnecessary and duplicative, and may increase latency for subsequent messages building up a backlog of messages yet to be updated and published. Whether to forgo the additional queuing may depend, for example, on how well the subsequent message can be determined to be the same message as the previous message aside from the updated data. For example, the message tuple may be examined to determine whether text, data source identifiers, flags, etc. are the same.

The message data, or the updated message data, may include any of a variety of suitable data types. For example, the message data may include any one or more of text (e.g., alphanumeric characters), an image, a video, audio, time, temperature, speed, location, or any of a number of other types not listed but which would be apparent to one of skill in the art and which are considered to be within the scope of this disclosure.

In one example, the method may include determining whether an update flag is set for the message to be updated. When the flag is not set, the message may be published as received from the publisher without updating the message data. The flag may be set or not set, such as by the inclusion of one or more characters or strings that identifies a 'set' state and/or one or more characters or strings that identifies a not set' state. In one example, presence and absence of a character or string in a flag field of the tuple may indicate the set or not set states. In one example, when the source identifier in the tuple is empty then the flag is not set.

The data source for the updated message data may be a third party data source. For example, the data source may belong to or be managed by the publisher or some other third party. The data source may optionally be external to a service provider environment in which the method is performed. For example, the data source may be a global positioning system (GPS) device, a camera, a thermometer or the like.

In one example, the updated message may be published by transmitting the updated message to the subscriber via a transmission control protocol (TCP). However, other types of transmission protocols which are not listed here are also contemplated.

The method may further include caching the updated message data from the data source for a predetermined period of time. For example, a publish-subscribe messaging system may include a caching data store within the service provider environment for caching the updated message data for the predetermined period of time. The predetermined period of time may be set by the publisher, by the service provider, or by the subscriber(s). Caching the updated message data may reduce potential latency when retrieving the updated message data from a data source external to the service provider environment to enable more rapid processing of queued messages as well as avoid placing a potentially large load on the original data source, communication networks, etc. When the predetermined period of time expires, the cached data may be updated from the original source and subsequent messages may continue to rely on the cached data. Alternatively, updating of the cached data may occur each time a message with updated data is received from the publisher. Alternatively, the service may periodically ping the original data source to determine whether an update is available. The service may monitor the expiry of the cached data or whether updated data is available and replace the cached data with the updated data when the updated data is available.

Figure 7:
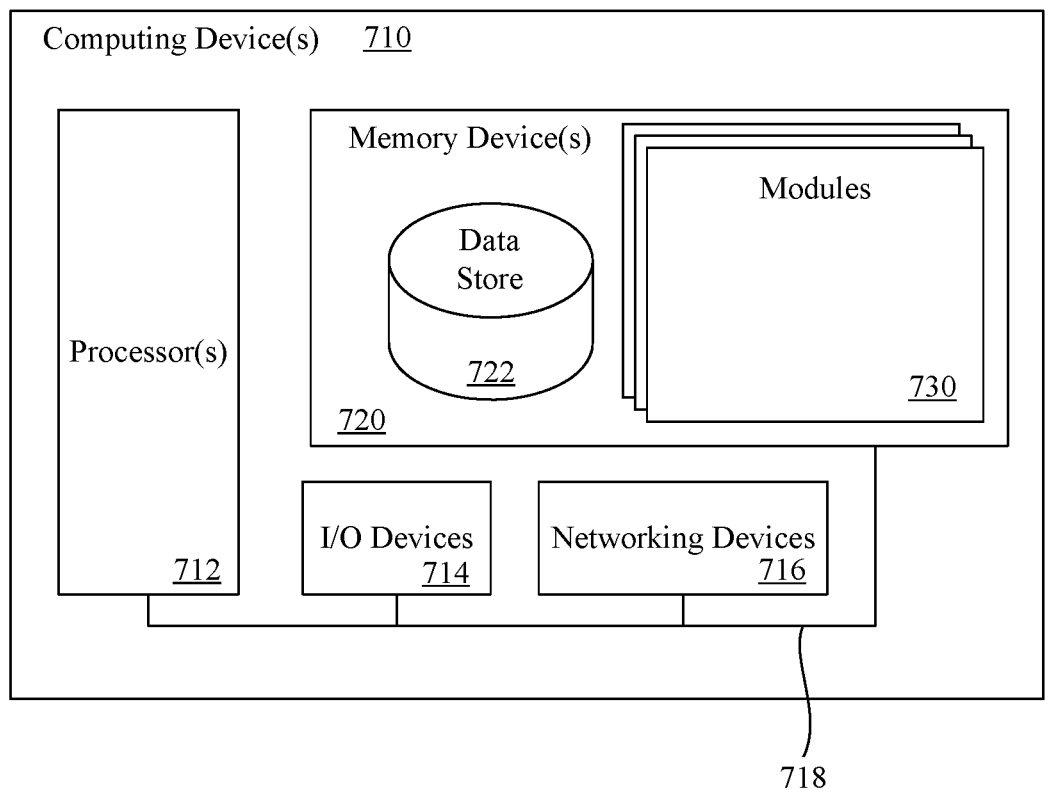
FIG. 7 is a block diagram of a computing system for use in managing publish-subscribe message updates in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer-implemented publish-subscribe messaging method, comprising:
   receiving a message sent from a publisher, at a broker that manages distribution of messages to subscribers, wherein the message includes:
   a tuple defining message data,
   an update flag with a state that, when set, instructs the broker to obtain updated message data for a queued message prior to publishing the queued message to one or more subscribers, and
   a data source identifier that identifies a data source external from the broker to update the message data;
   queuing, by the broker, the message in a queue of a plurality of messages for publication;
   determining, by the broker, that the state of the update flag is set to instruct the broker to obtain the updated message data prior to publishing the message to a subscriber;
   retrieving, by the broker, the data source identifier from the tuple included in the message when the message reaches a front of the queue of the plurality of messages;
   retrieving, by the broker and within a service provider environment, the updated message data from a data store using the data source identifier, wherein the data store maintains updated message data within the service provider environment corresponding to an update of the message data provided by the data source external from the broker;
   updating, by the broker, the tuple in the message to substitute the message data with the updated message data retrieved from the data store using the data source identifier to generate an updated message; and
   publishing, by the broker, the updated message to the subscriber.

2. The method of claim 1, wherein the publisher of the message sets the state of the update flag to instruct the broker to obtain the updated message data, which comprises time-sensitive message data, prior to publishing the message.

3. The method of claim 1, wherein the subscriber is a plurality of subscribers.

4. The method of claim 1, wherein the message is received from the publisher at a server and the data source is a clock at the server.

5. The method of claim 1, wherein the message is received from the publisher at a server and the data source is at the publisher.

6. The method of claim 1, wherein receiving the message comprises receiving the message at a service in a service provider environment, the method further comprising:
    caching the updated message data for a predetermined period of time in the service provider environment; and
    publishing updated messages to additional subscribers using the cached updated message data during the predetermined period of time.

7. The method of claim 6, further comprising retrieving additional updated message data after the predetermined period of time expires and caching the additional updated message data in the service provider environment.

8. The method of claim 1, wherein the message includes time information which becomes less accurate during a time-period in which the message is queued for publication, and the data source is a server clock.

9. The method of claim 1, further comprising identifying the data source to update the message data using an update rule.

10. The method of claim 1, wherein the data source is a third-party data source which is external to a service provider environment where the message is received.

11. The method of claim 1, wherein the data source is a sensor.

12. The method of claim 1, wherein the data source is movable and sends geolocation data in the message data.

13. A computer-implemented publish-subscribe messaging method, comprising:
    receiving a message sent from a publisher, at a broker which manages distribution of messages to subscribers, wherein the message includes:
        a tuple containing message data,
        an update flag with a state that, when set, instructs the broker to obtain updated message data for a queued message prior to publishing the queued message to one or more subscribers, and
        a data source identifier that identifies a data source external from the broker to update the message data;
    queuing, by the broker, the message in a queue of a plurality of messages for publication;
    determining, by the broker, that the message is located at an update point of the queue which causes the broker to update time information in the message data;
    obtaining, by the broker and within a service provider environment, updated message data from a data store, wherein the data store caches updated message data within the service provider environment corresponding to an update of the message data provided by the data source external from the broker;
    replacing, by the broker, the message data with the updated message data to generate an updated message; and
    publishing, by the broker, the updated message to a subscriber.

14. The method of claim 13, further comprising:
    determining whether the update flag is set for the message to be updated; and publishing the message as received from the publisher when the update flag is not set.

15. The method of claim 13, wherein the subscriber or the publisher is an Internet of Things device.

16. The method of claim 13, further comprising publishing the updated message by transmitting the updated message to the subscriber via a transmission control protocol (TCP).

17. A non-transitory computer-readable medium comprising computer-executable instructions that, as a result of being executed by one or more processors, cause the one or more processors to:
    receive a message at a broker from a publisher, the message including:
        a tuple containing message data which becomes less accurate during a time-period in which the message is queued among a plurality of messages for publication,
        an update flag with a state that, when set, instructs the broker to obtain updated message data for a queued message prior to publishing the queued message to one or more subscribers, and
        a data source identifier identifying a movable data source to update the message data;
    queue the message for publication to subscribers among the plurality of messages;
    determine that the message is located at an update point of the queue which causes the broker to update the message data;
    obtain, by the broker and within a service provider environment, updated message data from a data store using the data source identifier obtained from the tuple, wherein the data store caches updated message data within the service provider environment provided by the movable data source;
    replace the message data in the tuple in the message queued for publication with the updated message data to generate an updated message; and
    publish the updated message to the subscribers.

18. The non-transitory computer-readable medium of claim 17, wherein the updated message data is updated geolocation data and wherein the computer-executable instructions, as a result of being executed by the one or more processors, further cause the processors to:
    cache the updated geolocation data for a predetermined period of time in a service provider environment; and
    publish updated messages to additional subscribers using the cached updated geolocation data during the predetermined period of time.

19. The non-transitory computer-readable medium of claim 18, wherein the computer-executable instructions, as a result of being executed by the one or more processors, further cause the one or more processors to:
    retrieve additional updated geolocation data after the predetermined period of time expires; and
    cache the additional updated geolocation data in the service provider environment.

20. The non-transitory computer-readable medium of claim 17, wherein the movable data source is remote from the broker and is accessible over a network.

* * * * *